(12) United States Patent
Kivity

(10) Patent No.: US 10,761,957 B2
(45) Date of Patent: *Sep. 1, 2020

(54) OPTIMIZATION OF OPERATING SYSTEM AND VIRTUAL MACHINE MONITOR MEMORY MANAGEMENT

(71) Applicant: Red Hat Israel, Inc., Raanana (IL)

(72) Inventor: Avi Kivity, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 56 days.

This patent is subject to a terminal disclaimer.

(21) Appl. No.: 15/692,198

(22) Filed: Aug. 31, 2017

(65) Prior Publication Data

US 2017/0364430 A1  Dec. 21, 2017

Related U.S. Application Data

(63) Continuation of application No. 13/483,618, filed on May 30, 2012, now Pat. No. 9,753,831.

(51) Int. Cl.
| | | |
|---|---|---|
| *G06F 11/34* | (2006.01) | |
| *G06F 9/50* | (2006.01) | |
| *G06F 9/455* | (2018.01) | |
| *G06F 12/10* | (2016.01) | |

(52) U.S. Cl.
CPC ...... *G06F 11/3433* (2013.01); *G06F 9/45558* (2013.01); *G06F 9/5016* (2013.01); *G06F 9/5022* (2013.01); *G06F 11/348* (2013.01); *G06F 12/10* (2013.01); *G06F 2009/45583* (2013.01); *G06F 2201/81* (2013.01); *G06F 2201/815* (2013.01); *G06F 2201/885* (2013.01); *G06F 2212/151* (2013.01)

(58) Field of Classification Search
CPC ...... G06F 12/10; G06F 9/5016; G06F 9/5022; G06F 2212/151; G06F 9/45558; G06F 2201/885; G06F 11/3433; G06F 11/348; G06F 2201/81; G06F 2201/815; G06F 2009/45583
See application file for complete search history.

(56) References Cited

U.S. PATENT DOCUMENTS

| | | | | |
|---|---|---|---|---|
| 8,583,875 B1* | 11/2013 | Garthwaite | ........... | G06F 9/4881 711/147 |
| 2011/0154104 A1 | 6/2011 | Swanson et al. | | |
| 2012/0011504 A1* | 1/2012 | Ahmad | .................. | G06F 12/08 718/1 |
| 2012/0030407 A1 | 2/2012 | Pandey et al. | | |
| 2012/0047312 A1* | 2/2012 | Nathuji | ................. | G06F 9/3832 711/6 |

(Continued)

*Primary Examiner* — David Yi
*Assistant Examiner* — Zubair Ahmed
(74) *Attorney, Agent, or Firm* — Lowenstein Sandler LLP

(57) ABSTRACT

A method and system for collecting statistics associated with multiple memory nodes to determine if a read-only page is read accessed in aggregate by multiple processing devices of the multiple memory nodes at or above a first threshold value. If so, the read-only page may be replicated to an additional memory node. If a determination is made that the read-only page is read accessed in aggregate by the multiple processing devices below the first threshold value, the read-only page may be de-replicated upon receipt of a write request associated with the read-only page.

20 Claims, 3 Drawing Sheets

(56) References Cited

U.S. PATENT DOCUMENTS

| | | | |
|---|---|---|---|
| 2012/0110237 A1* | 5/2012 | Li | G06F 9/45558 |
| | | | 711/6 |
| 2012/0221812 A1* | 8/2012 | Accapadi | G06F 9/5016 |
| | | | 711/160 |
| 2013/0031293 A1* | 1/2013 | Van Riel | G06F 12/10 |
| | | | 711/6 |

* cited by examiner

OPTIMIZATION OF OPERATING SYSTEM AND VIRTUAL MACHINE MONITOR MEMORY MANAGEMENT

CROSS-REFERENCE TO RELATED APPLICATION

This application is a continuation of U.S. patent application Ser. No. 13/483,618, filed May 30, 2012, the entirety of which is incorporated herein by reference.

TECHNICAL FIELD

Embodiments of the present invention relate to a computing system, and more specifically, relate to a system and method for managing memory using a virtual machine monitor or operating system kernel.

BACKGROUND

Virtualization allows multiplexing of an underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor, or a host operating system. The hypervisor emulates the underlying hardware of the host computer, making the use of the virtual machine transparent to the guest operating system and the user of the computer.

In virtual machine systems, memory management is one of the most fundamental issues. Typically, a computer system includes a hierarchy of memory that ranges from a small, fast cache of main memory that is placed in front of a larger, but slower, auxiliary memory. The cache is generally implemented using a physical memory, such as RAM, while the auxiliary memory is implemented using a storage device, such as a disk drive or hard disk. Both memories are usually managed in uniformly sized units known as pages. Because of their impact on performance, caching algorithms that manage the contents of the main memory are of tremendous importance to a significant number of computer systems, servers, storage systems, and operating systems.

In addition, many computers and operating systems today implement a virtual memory. Virtual memory is where the computer system emulates that it has more memory than the computer system actually possesses.

In order to provide a virtual memory of this size, the computer system runs the application or process in a memory address space that is virtual, i.e., not tied to the physical memory. The computer system then swaps pages (i.e., units of memory) in and out of a cache in its physical memory in order to emulate the virtual memory. Data structures such as page tables and translation lookaside buffers (TLB) are typically utilized to manage the pages. During operation, an application or process continually request pages using virtual memory addresses. In response, the computer system will translate the virtual memory address into a physical memory address and determine if the page is present in the cache (i.e., the page is resident). When a requested page is not present in the cache, it is called a cache "miss" (or page fault), and the requested page must be retrieved from storage.

The physical memory may be arranged to include multiple memory nodes each with a local processor, a memory controller and local memory. For example, under a non-uniform memory access (NUMA) architecture, the memory access time depends on the memory location relative to a processor (i.e., a processor accesses the local memory in the associated memory node (i.e., a NUMA node) faster than the memory of a remote memory node).

Memory management techniques, executed by VMMs or by operating system kernels (OSK) are utilized in such computer systems, however these techniques invoke significant inefficiencies if an incorrect or non-optimal memory management decision is made and/or require significant monitoring and involvement by a system administrator. According to such techniques, memory decisions relating to page size, page placement (i.e., assignment of the page to a memory node), and page replication (i.e., copying a page to one or more additional memory nodes) are made in a manual, static manner to optimize memory usage and allocation.

According to page size management methodologies, a control monitor (i.e., the VMM or OSK) selects a page size for the pages comprises within a region. However, if the control monitor selects a small page size for a heavily accessed region (i.e., a collection of pages), it will incur heavy TLB pressure, which reduces performance. Likewise, if the control monitor chooses a large page size for an infrequently accessed region (to reduce the number of pages in the region), it loses tracking granularity for that region, and so may later make incorrect swap choices.

Page placement management techniques also suffer from inefficiencies. For example, in a NUMA architecture, a process can be bound to a specific node through a manual and static decision by a system administrator. If the control monitor (VMM/OSK) places a heavily accessed page in a different memory node (e.g., a NUMA node) than where the processing device performing most of the access resides, then it incurs a performance penalty for cross-node access. Similarly, if the VMM/OSK places an infrequently accessed page in the same memory node as the processing device that accesses it, then it increases memory pressure on that memory node, and can cause heavily accessed pages to be swapped out or migrated away.

Furthermore, page replication techniques also present problems, in that if a heavily accessed read-only page (typically a library or executable page) is instantiated once, then it may incur a performance penalty when accessed from a remote memory node. Moreover, if multiple copies of a read-only page are instantiated, and that page is not heavily accessed, then memory has been wasted for little gain.

Although current processing devices offer a performance monitoring unit (PMU) that allows for tracking memory access information and identifying memory nodes having heavy activity, the typical means of using PMUs requires a user (e.g., the system administrator) to run a profiler identifying problem areas and making manual decisions (e.g., pinning memory and/or processes to specific memory nodes or processors). This manual and static approach to memory management consumes considerable amounts of time and resources, and does not adapt when the workload, application, and/or hardware changes.

DETAILED DESCRIPTION

Figure 1:
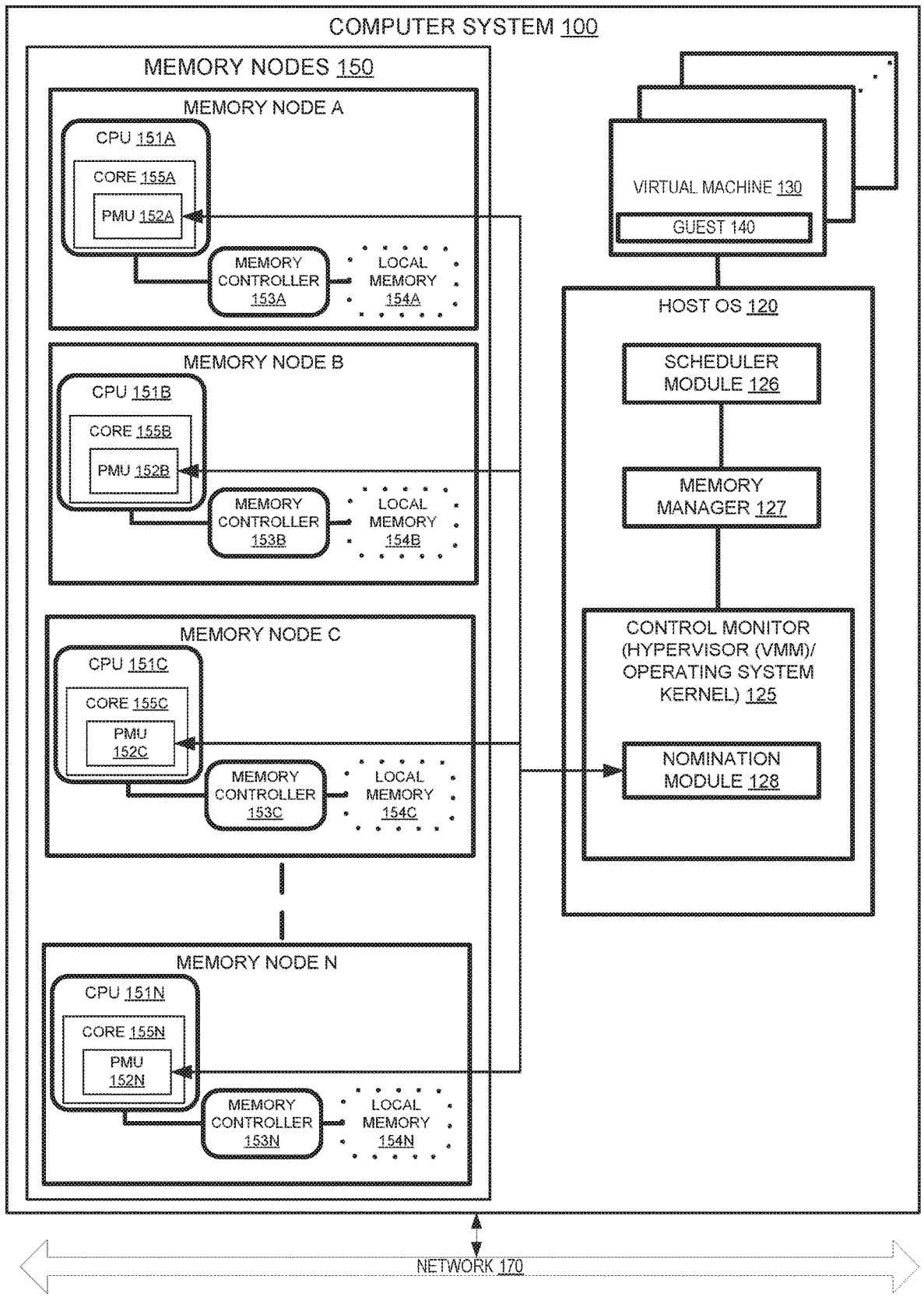
FIG. 1 is a block diagram of an exemplary computer architecture in which embodiments of the invention may operate.

Methods and systems for managing memory in computing system including a number of memory nodes. A host operating system includes a control monitor (i.e., a VMM or OSK) configured to dynamically optimize memory configuration and utilization employing a memory management methodology. The control monitor includes a nomination module configured to dynamically communicate with a performance monitoring unit (PMU) associated with each processing device (i.e., CPU) of the multiple memory nodes. The nomination module collects memory statistics from the multiple PMUs. The memory statistics include any suitable memory management information, including but not limited to, information about cache misses, cross node references, memory access time, TLB accesses and misses, etc.

Based on the collected memory statistics, the nomination module detects access and activity information regarding the pages and/or regions (i.e., a collection of pages). The access information is analyzed by the nomination module in order to generate a "nomination" of one or more pages and/or regions for further consideration and appropriate action by a scheduler module and/or memory manager of the control monitor.

In one embodiment, the nomination module analyzes the memory statistics and identifies one or more pages that are accessed from a single remote memory node at or above an access threshold (i.e., a predetermined access level used to identify pages that are heavily accessed by a memory node). The nomination module then nominates the identified pages for migration to the single remote memory node via a communication to the scheduler module and/or memory manager. A nomination page may then be placed in the node that is heavily accessing the page by the scheduler module and/or memory manager, resulting in the previously remote memory node being the local memory node associated with the page. Advantageously, the above-described identification of optimal page placement nominees provides for a reduction of the costs associated with accessing a page from a remote processing device. One having ordinary skill in the art will appreciate that the single remote memory node may be different for each page.

Optionally, the nomination module may be configured to determine if a previously migrated page is being accessed by the now local memory node below the access threshold. If so, the nomination module nominates the previously migrated page for de-migration, or migration back to the memory node previously associated with the page or to another memory node.

In another embodiment, the nomination module analyzes the memory statistics received from the one or more PMUs and identifies one or more pages that are accessed from multiple memory nodes at or above a multiple access threshold (i.e., a predetermined access level used to identify pages that are heavily accessed in aggregate by multiple memory nodes). The nomination module then nominates the identified pages for replication (i.e., copying of the identified pages to one or more additional remote memory nodes) via a communication to the scheduler module and/or memory manager. Advantageously, the above-described identification of page replication nominees provides an optimized solution which reduces the penalty associated with having pages that are heavily accessed by remote memory nodes while dynamically selecting appropriate pages for replication to minimize the cost associated with replicating pages to multiple nodes.

In an embodiment, the pages may be accessed for read operations, and are de-replicated when a write operation occurs. One exemplary method for arranging the read-only access is to only allow pages that are mapped with read-only protection to be replicated. Another method is to map the pages as read-only, even when a user requests read-write access, and de-replicate on the first write.

Optionally, the nomination module may be configured to determine if a previously replicated page is being accessed below the multiple access threshold. If so, the nomination module nominates the previously replicated page for de-replication by deleting the previously generated copies of the page.

In yet another embodiment, the nomination module analyzes the memory statistics and identifies one or more regions (i.e., a collection pages) including multiple pages that are accessed from one or more memory nodes at or above an access threshold. The nomination module then nominates the identified regions for promotion to an updated region including multiple large pages is pages for replication via a communication to the scheduler module and/or memory manager. For example, a large page may be approximately 2 MB and a small page is approximately 4 kB, with the sizes determined by the hardware and varying depending on the vendor. The dynamic detection of region promotion nominees results in an efficient adjustment of the pages in the region from a small page size to a large page size.

Optionally, the nomination module may be configured to determine if a previously promoted region is being accessed below the access threshold. If so, the nomination module nominates the previously promoted region for demotion into a further updated region including multiple small pages.

One having ordinary skill in the art will appreciate that, based on the nomination, the scheduler module and/or memory manager may consider the nominated pages and/or regions for migration, replication, and/or promotion depending on the availability of resources (e.g., memory, CPU, direct memory access (DMA) engines) according to any suitable methodology known in the art.

In an embodiment, the nomination module may be configured to perform any combination of the page migration/de-migration, page replication/de-replication, and region promotion/demotion nomination processes.

Accordingly, an efficient memory management mechanism is provided that optimizes the utilization of memory resources by dynamically monitoring memory statistics and coordinating appropriate page migration, replication, and promotion. The system and method according to embodiments of the present invention are configured to provide page-level decisioning and pinning of particular pages of memory to achieve granular and dynamic memory management, without the need for continual manual oversight, decision-making, and action by a user (e.g., a system administrator). In addition, the memory management system and method according to embodiments of the present invention provide for monitoring and utilization of memory statistics that can not be dynamically tracked manually by an administrator.

FIG. 1 is a block diagram that illustrates an embodiment of a computer system 100 in which embodiments of the present invention may operate. The computer system 100 hosts multiple virtual machines (VM) 130. Each virtual machine 130 runs a guest operating system (e.g., guest 140) to manage its resources. The virtual machines 130 may run the same or different guest operating systems, such as Microsoft Windows®, Linux®, Solaris®, Mac® OS, etc. The computer system 100 may be a server, a workstation, a personal computer (PC), a mobile phone, a palm-sized computing device, a personal digital assistant (PDA), etc.

In one embodiment, the computer system 100 runs a control monitor 125 to virtualize access to the underlying host hardware, making the use of the virtual machine 130 transparent to the guest 140 and the users of the computer system 100. In one embodiment, the control monitor 125 is a hypervisor or virtual machine monitor (VMM). In another embodiment, the control monitor 125 is an operating system kernel (OSK).

In one embodiment, the control monitor 125 may support multiple virtual machines 130. In an embodiment, the control monitor 125 is part of a host operating system (OS) 120. According to an embodiment, the host operating system 120 includes a scheduler module 126 and a memory manager 127. The scheduler module 126 is the component of the OS 120 that determines which processes should be run, when, and where according to a scheduling policy and the availability of resources (e.g., memory, CPU, DMA engines) and maps the virtual machines 130 to CPU resources. One having ordinary skill in the art will appreciate that any suitable scheduler module known in the art may be implemented in accordance with the embodiments of the present invention. The memory manager 127 is the component of the OS 120 that receives memory requests and performs memory allocations according to a memory allocation policy and the availability of resources (e.g., memory, CPU, DMA engines). One having ordinary skill in the art will appreciate that any suitable memory manager known in the art may be implemented in accordance with the embodiments of the present invention.

In one embodiment, the computer system 100 is accessible by remote systems via a network 170. The network 170 may be a private network (e.g., a local area network (LAN), a wide area network (WAN), intranet, etc.) or a public network (e.g., the Internet).

In an embodiment, the computer system 100 includes multiple memory nodes 150 (e.g., memory node A, memory node B, memory node C . . . memory node N). Each memory node 150 may include one or more computer processing units (CPU) 151. In an embodiment, each CPU 151 may include one or more cores 155 running one or more hardware threads. Each core includes a performance monitoring unit (PMU) 152. Each CPU 151 is associated with a memory controller 153. Optionally, the memory controller 153 may have an associated local memory 154 (the optional nature of the local memory 154 is denoted in FIG. 1 by the dashed line). In the embodiment illustrated in FIG. 1, the multiple memory nodes 150A, 150B, 150C, . . . 150N each include a CPU (e.g., CPU 151A for memory node A) having a core (e.g., core 155A) including an associated PMU (e.g., PMU 152A). One having ordinary skill in the art will appreciate that the computer system 100 may include any number of memory nodes 150 and that each memory node 150 may include any number of CPUs 151 having any number of cores 155 running one or more hardware threads and including an associated PMU 152. According to an embodiment, the memory nodes 150 are non-uniform memory access (NUMA) nodes arranged in any suitable NUMA architecture.

According to one embodiment of the present invention, the control monitor 125 includes a nomination module 128 configured to collect memory statistics from the communicatively connected PMUs 152. The memory statistics include any suitable memory management information, including but not limited to, information about cache misses, cross node references, memory access time, etc. Based on the collected memory statistics, the nomination module 128 detects a level at which one or more pages and/or regions of the local memory 154 are accessed (i.e., an access level) and nominates select pages and/or regions for page migration, page replication, and/or page promotion, as described in detail below in connection with FIG. 2.

Figure 2:
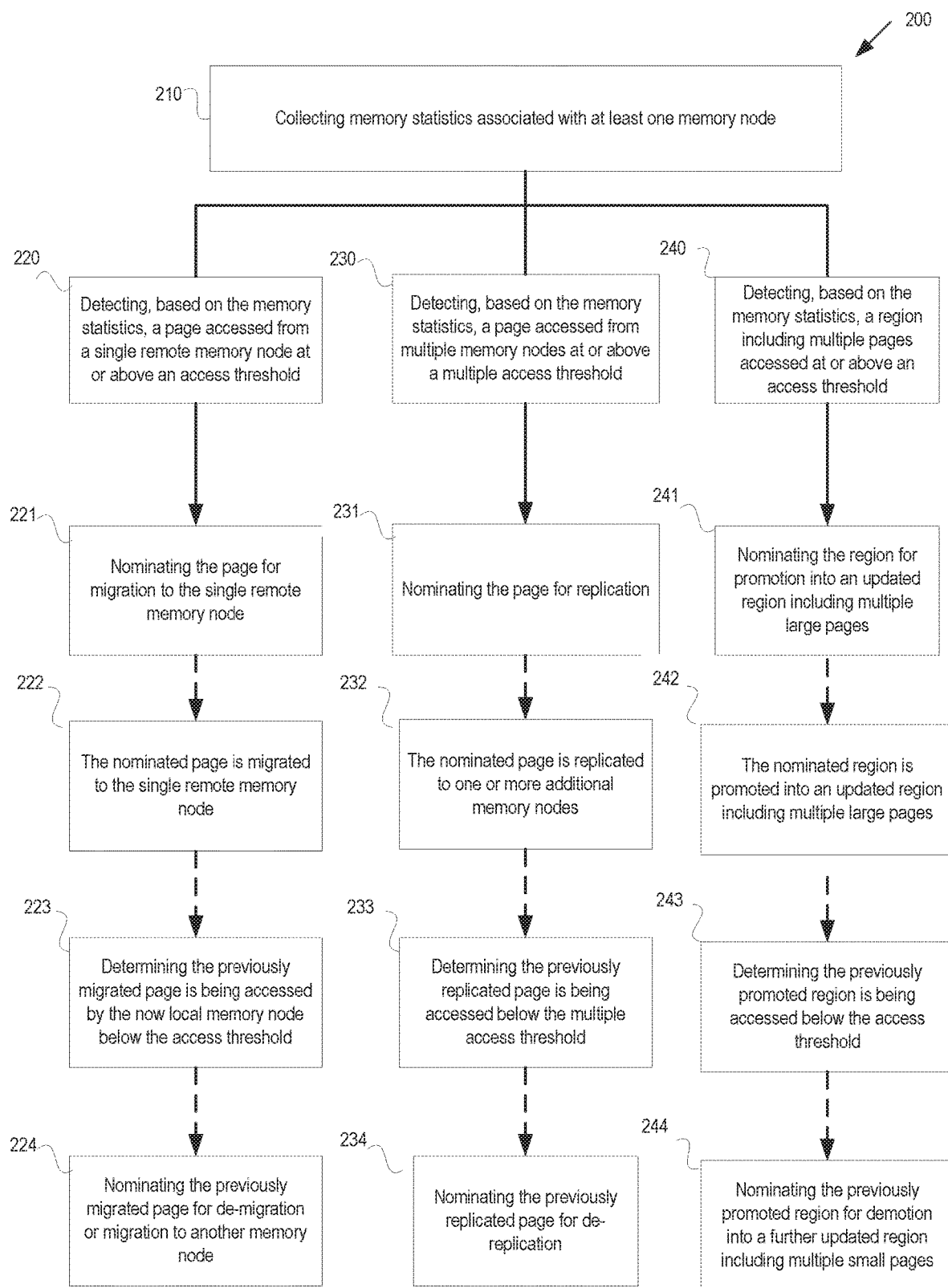
FIG. 2 is a flow diagram of embodiments of a method for managing memory.

FIG. 2 is a flow diagram illustrating one embodiment of a method 200 for dynamically managing multiple memory nodes 150 of a computing system 100. The method 200 may be performed by a computer system 300 of FIG. 3 that may comprise hardware (e.g., circuitry, dedicated logic, programmable logic, microcode, etc.), software (e.g., instructions run on a processing device), or a combination thereof. In one embodiment, the method 200 is performed by the nomination module 128 of the control monitor 125 of FIG. 1. One having ordinary skill in the art will appreciate that the control monitor 125 may be either a VMM or an OSK.

Referring to FIG. 2, in one embodiment, the method 200 begins when the nomination module 128 collects memory statistics associated with the one or more memory nodes 150 via a communication with the PMU 152, in block 210. One having ordinary skill in the art will appreciate that manner in which the memory statistics are collected is based on the type of PMU 152 used, and defined in accordance with the specifications set forth by the PMU vendor. In a first example, a PMU may be used that generates an interrupt detectable by the nomination module 128 when a sample is taken. In a second example, a PMU may be used that fills a memory buffer with the collected memory statistics and then raises an interrupt when the buffer is filled beyond a threshold. In an embodiment, the rate at which the sampling occurs may be selected based on a balancing between collection accuracy (i.e., higher frequency) and minimizing overhead (i.e., lower frequency). One having ordinary skill in the art will appreciate that any suitable method of communicating the memory statistics from the PMU 152 to the nomination module 128 may be utilized, such as, for example, communicating a list of tuples, each containing suitable information, such as, a page number, access type, accessing thread, and number of accesses.

In an embodiment, in block 220, based on the memory statistics, the nomination module 128 detects one or more pages of the local memory 154 of the associated memory node 150 accessed from one or more CPUs 151 of a single remote memory node at or above an access threshold. The access threshold is a predetermined value used to compare with the access level of a page and/or region for determining an appropriate nomination action. In an embodiment, the nomination module 128 determines a level of access to a page and compares that value to the access threshold.

In block 221, the nomination module 128 nominates the one or more pages for migration to the single remote memory node to avoid the penalty associated with the access to the one or more pages by the remote CPU. The nomination includes a communication by the nomination module 128 to one or both of the scheduler module 126 and the memory manager 127. One having ordinary skill in the art will appreciate that the scheduler module 126 and/or the memory manager 127 may execute the corresponding action (i.e., migration of the nominated page(s)) based on the availability of resources and in accordance with any suitable method known in the art.

For example, the nomination module 128 may detect that CPU 151B of memory node B (i.e., the single remote memory node) is accessing a page (e.g., page XYZ) of the local memory 154A of memory node A at or above the access threshold, in block 220. Accordingly, in block 221, the nomination module 128 nominates page XYZ for migration to memory node B (i.e., the single remote memory node).

In an optional embodiment, following block 221, the nomination module 128 may continue to collect memory statistics and determine that the one or more previously migrated pages are being accessed by the now local CPU(s) 151 below the access threshold. Accordingly, in block 223, the nomination module 128 nominates the previously migrated page for de-migration (i.e., migration back to the page's previous memory node) or migration to another memory node. One having ordinary skill in the art will appreciate that blocks 222, 223, and 224 are optional extensions of the method 200, and that the optional nature of the blocks is denoted in FIG. 2 by dashed lines.

In an embodiment, in block 222, the page nominated for migration is migrated by either the scheduler module or memory manager of the control monitor. Continuing the example above, in block 223, based on the memory statistics collected from PMU 152B, the nomination module 128 determines that page XYZ, now migrated to local memory 154B of memory node B, is being accessed by CPU 151B below the access threshold. Accordingly, in block 224, the nomination module 128 nominates page XYZ for de-migration back to local memory 154A of memory node A or migration of page XYZ to local memory 154C of memory node C.

According to an embodiment, in block 230, based on the memory statistics collected in block 210, the nomination module 128 detects one or more pages of the local memory 154 of the associated memory node 150 accessed from multiple CPUs 151 of multiple memory nodes at or above a multiple access threshold. The multiple access threshold is a predetermined value used to compare with the access level of a page and/or region by multiple memory nodes 150 for determining an appropriate nomination action. In an embodiment, the nomination module 128 determines a level of access to a page by multiple memory nodes and compares that value to the multiple access threshold.

In block 231, the nomination module 128 nominates the one or more pages identified in block 230 for replication (i.e., copying) to one or more additional memory nodes 150. In block 232, the scheduler module 126 and/or the memory manager 127 may replicate the nominated page to the one or more additional memory nodes. One having ordinary skill in the art will appreciate that the scheduler module 126 and/or the memory manager 127 may execute the replication of the nominated page(s) based on the availability of resources and in accordance with any suitable method known in the art.

For example, the nomination module 128 may detect that CPU 151B of memory node B, CPU 151C of memory node C, and CPU 151N of memory node N (i.e., the multiple memory nodes) are each accessing a page (e.g., page XYZ) of the local memory 154A of memory node A at or above the multiple access threshold, in block 230. Accordingly, in block 231, the nomination module 128 nominates page XYZ for replication to memory nodes B, C, and N.

In an optional embodiment, following block 232, the nomination module 128 may continue to collect memory statistics and determine that the one or more previously replicated pages are being accessed by the multiple memory nodes 150 below the multiple access threshold. Accordingly, in block 234, the nomination module 128 nominates the previously replicated one or more pages for de-replication (i.e., removal of the additional copies). One having ordinary skill in the art will appreciate that blocks 232, 233 and 234 are optional extensions of the method 200, and that the optional nature of the blocks is denoted in FIG. 2 by dashed lines.

Continuing the example above relating to blocks 230, 231, and 232, in block 233, based on the memory statistics collected from PMU 152B, PMU 152C, and PMU 152N determines that page XYZ is being accessed by CPU 151B, CPU 151C, and CPU 151N below the multiple access threshold. Accordingly, in block 234, the nomination module 128 nominates page XYZ for de-replication (i.e., the removal of the copies of page XYZ from memory nodes B, C, and N.

According to an embodiment, in block 240, based on the memory statistics, the nomination module 128 detects one or more regions of the local memory 154 of the associated memory node 150 including multiple pages each accessed from one or more CPUs 151 at or above an access threshold. In an embodiment, the nomination module 128 determines a level of access to the multiple pages in a region and compares those values to the access threshold.

In block 241, the nomination module 128 nominates the one or more regions identified in block 240 for promotion into an updated region including multiple large pages. The pages are nominated for a change in page size, in order to reduce the pressure on the data structures (e.g., page tables and TLB) and cache. By analyzing the memory statistics, the nomination module 128 is configured to dynamically detect whether a large page size is appropriate, or if the current (smaller) page size should be maintained. In an embodiment, a page is considered a large page if its size is approximately 2 MB or greater. In block 242, the scheduler module 126 and/or the memory manager 127 may promote the nominated region into an updated region. One having ordinary skill in the art will appreciate that the scheduler module 126 and/or the memory manager 127 may execute the corresponding promotion action based on the availability of resources and in accordance with any suitable method known in the art.

For example, the nomination module 128 may detect that CPU 151B of memory node B and CPU 151C of memory node C are accessing pages DEF, GHI, JKL and MNO of region R of the local memory 154A of memory node A at or above the access threshold, in block 240. Accordingly, in block 241, the nomination module 128 nominates pages DEF, GHI, JKL and MNO of region R for promotion into an updated region (e.g., region R') including multiple large pages, such as pages DEFGHI and JKLMNO.

In an optional embodiment, following blocks 241 and 242, the nomination module 128 may continue to collect memory statistics and determine that the one or more previously promoted pages are being accessed below the access threshold, in block 243. Accordingly, in block 244, the nomination module 128 nominates the previously migrated page for demotion (i.e., a reduction to a smaller page size). One having ordinary skill in the art will appreciate that blocks 242, 243, and 244 are optional extensions of the method 200, and that the optional nature of the blocks is denoted in FIG. 2 by dashed lines.

Continuing the example above relating to blocks 240, 241, and 242, in block 243, based on the memory statistics collected from PMU 152B of memory node B and PMU 152C of memory node C, the nomination module 128 determines that the previously promoted pages DEFGHI and JKLMNO are being accessed by CPU 151B and CPU 151C below the access threshold. Accordingly, in block 244, the nomination module 128 nominates pages DEFGHI and JKLMNO for demotion to smaller pages (e.g., pages DEF, GHI, JKL, and MNO).

According to an embodiment of the present invention, the nomination module 128 may also be configured to provide a reporting function including statistics concerning the nominations made by the nomination module 128 and subsequent action (or inaction) taken by the scheduler module 126 and/or memory manager 127.

Figure 3:
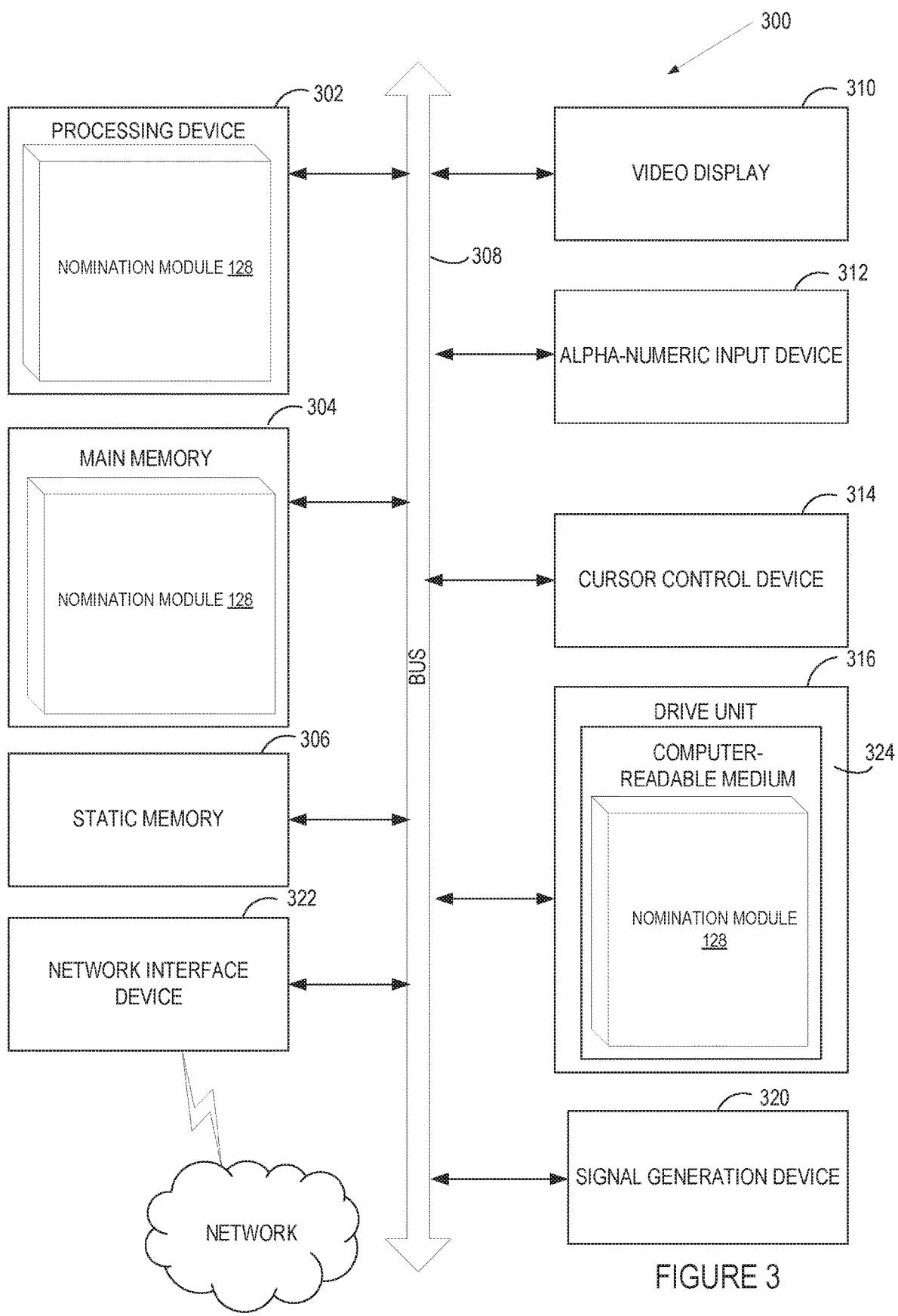
FIG. 3 illustrates an exemplary memory management system.

FIG. 3 illustrates an exemplary memory management system 300 in the form of a computer system within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary memory management system 300 includes a processing system (processing device) 302, a main memory 304 (e.g., read-only memory (ROM), flash memory, dynamic random access memory (DRAM) such as synchronous DRAM (SDRAM)), a static memory 306 (e.g., flash memory, static random access memory (SRAM)), and a data storage device 316, which communicate with each other via a bus 306.

Processing device 302 represents one or more general-purpose processing devices such as a microprocessor, central processing unit, or the like. More particularly, the processing device 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 302 may also be one or more special-purpose processing devices such as an application specific integrated circuit (ASIC), a field programmable gate array (FPGA), a digital signal processor (DSP), network processor, or the like. The nomination module 128 in FIG. 1 may comprise processing device 302 configured to perform the operations and steps discussed herein.

The memory management system 300 may further include a network interface device 322. The memory management system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

A drive unit 316 may include a computer-readable medium 324 on which is stored one or more sets of instructions embodying any one or more of the methodologies or functions described herein. The instructions may also reside, completely or at least partially, within the main memory 304 and/or within the processing device 302 during execution thereof by the memory management system 300, the main memory 304 and the processing device 302 also constituting computer-readable media. The instructions may further be transmitted or received over a network via the network interface device 322.

While the computer-readable storage medium 324 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding, carrying, or being programmed with a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "collecting", "detecting", "nominating", "determining" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   determining, by a processing device, in view of memory statistics collected at a selected frequency from a plurality of memory nodes, a first page accessed in aggregate by a plurality of processing devices of the plurality of memory nodes at or above a first threshold value;
   determining the first page is mapped with read-only protection;
   in response to determining the first page is mapped with read-only protection and accessed in aggregate by the plurality of processing devices of the plurality of memory nodes at or above a first threshold value, replicating, by the processing device, the first page to generate a copy of the first read-only page to be stored at an additional memory node;
   determining, in view of updated memory statistics collected at the selected frequency, the first page is accessed in aggregate by the plurality of processing devices of the plurality of memory nodes below the first threshold value; and
   in response to receipt of a write request associated with the first page, de-replicating, by the processing device, the first page to delete the copy of the first page.

2. The method of claim 1, further comprising nominating the first page for replication via a communication to a scheduler.

3. The method of claim 2, wherein the scheduler executes the replicating of the first page in response to determining an availability of resources.

4. The method of claim 1, wherein the memory statistics comprise at least one of information relating to one or more cache misses, information relating to cross node references, or information relating to memory access time.

5. The method of claim 1, further comprising nominating the first page for replication via a communication to a memory manager component, the memory manager component to receive a memory request and perform memory allocation according to at least one of a memory allocation policy or an availability of resources.

6. The method of claim 1, wherein the plurality of memory nodes comprises a first memory node comprising a performance monitoring unit (PMU).

7. The method of claim 6, wherein the PMU generates an interrupt in response to at least one of a collection of at least a portion of the memory statistics or a filling of a memory buffer at or above a threshold buffer size.

8. A non-transitory computer readable storage medium having instructions that, when executed by a processing device, cause the processing device to perform operations comprising:
   determining in view of memory statistics collected at a selected frequency from a plurality of memory nodes, a first page is read accessed in aggregate by a plurality of processing devices of the plurality of memory nodes at or above a first threshold value;
   determining the first page is mapped with read-only protection;
   in response to determining the first page is mapped with read-only protection and accessed in aggregate by the plurality of processing devices of the plurality of memory nodes at or above a first threshold value, replicating, by the processing device, the first page to generate a copy of the first read-only page to be stored at an additional memory node;
   determining, in view of updated memory statistics collected at the selected frequency, the first read-only page is read accessed in aggregate by the plurality of processing devices of the plurality of memory nodes below the first threshold value; and
   in response to receipt of a write request associated with the first page, de-replicating the first page to delete the copy of the first page.

9. The non-transitory computer readable storage medium of claim 8, the operations further comprising nominating the first page for replication via a communication to a scheduler.

10. The non-transitory computer readable storage medium of claim 9, wherein the scheduler executes the replicating of the first page in response to determining an availability of resources.

11. The non-transitory computer readable storage medium of claim 8, wherein the memory statistics comprise at least one of information relating to one or more cache misses, information relating to cross node references, or information relating to memory access time.

12. The non-transitory computer readable storage medium of claim 8, the operations further comprising nominating the first page for replication via a communication to a memory manager component, the memory manager component to receive a memory request and perform memory allocation according to at least one of a memory allocation policy or an availability of resources.

13. A computing device comprising:
   a memory; and a processing device coupled to the memory, the processing device to perform operations comprising:
      determining in view of memory statistics collected at a selected frequency from a plurality of memory nodes, a first page is read accessed in aggregate by a plurality of processing devices of the plurality of memory nodes at or above a first threshold value;
      determining the first page is mapped with read-only protection;
      in response to determining the first page is mapped with read-only protection and accessed in aggregate by the plurality of processing devices of the plurality of memory nodes at or above a first threshold value, replicating, by the processing device, the first page to generate a copy of the first read-only page to be stored at an additional memory node;
      determining, in view of updated memory statistics collected at the selected frequency, the first read-only page is read accessed in aggregate by the plurality of processing devices of the plurality of memory nodes below the first threshold value; and in response to receipt of a write request associated with the first page, de-replicating the first page to delete the copy of the first page.

14. The computing device of claim 13, the operations further comprising nominating the first page for replication via a communication to a scheduler.

15. The computing device of claim 14, wherein the scheduler executes the replicating of the first page in response to determining an availability of resources.

16. The computing device of claim 13, wherein the memory statistics comprise at least one of information relating to one or more cache misses, information relating to cross node references, or information relating to memory access time.

17. The computing device of claim 13, the operations further comprising nominating the first page for replication via a communication to a memory manager component, the memory manager component to receive a memory request and perform memory allocation according to at least one of a memory allocation policy or an availability of resources.

18. The computing device of claim 13, wherein the plurality of memory nodes comprises a first memory node comprising a performance monitoring unit (PMU).

19. The computing device of claim 13, wherein the performance monitoring unit (PMU) generates an interrupt in response to at least one of a collection of at least a portion of the memory statistics or a filling of a memory buffer at or above a threshold buffer size.

20. The computing device of claim 13, the operations further comprising:
  detecting, in view of the memory statistics, a first region of a local memory of the first memory node comprises a first page accessed at or above a first threshold value and a second page accessed at or above the first threshold value; and
  nominating the first region to be promoted to an updated region of the local memory.

* * * * *